United States Patent
Mouskeftaras et al.

(10) Patent No.: US 11,009,652 B2
(45) Date of Patent: May 18, 2021

(54) LUMINOUS DISPLAY DEVICE

(71) Applicant: The Swatch Group Research and Development Ltd, Marin (CH)

(72) Inventors: Alexandros Mouskeftaras, Marseilles (FR); Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/589,226

(22) Filed: Oct. 1, 2019

(65) Prior Publication Data
US 2020/0110215 A1 Apr. 9, 2020

(30) Foreign Application Priority Data

Oct. 9, 2018 (EP) ..................................... 18199430

(51) Int. Cl.
*F21V 8/00* (2006.01)
*G04B 19/30* (2006.01)

(52) U.S. Cl.
CPC ........... *G02B 6/0076* (2013.01); *G02B 6/003* (2013.01); *G02B 6/005* (2013.01); *G02B 6/0091* (2013.01); *G04B 19/305* (2013.01)

(58) Field of Classification Search
CPC ...... G02B 6/003; G02B 6/005; G02B 6/0076; G02B 6/0091; G04B 19/30; G04B 19/305
See application file for complete search history.

(56) References Cited

U.S. PATENT DOCUMENTS

| | | | | |
|---|---|---|---|---|
| 2,831,453 A | * | 4/1958 | Hardesty | G02B 6/0055 116/288 |
| 2,886,911 A | * | 5/1959 | Hardesty | H01H 9/18 40/546 |
| 3,079,748 A | * | 3/1963 | Hultquist | G04B 19/30 368/226 |
| 4,274,358 A | * | 6/1981 | Nakamura | B60K 37/02 116/288 |

(Continued)

FOREIGN PATENT DOCUMENTS

| | | |
|---|---|---|
| CH | 698 868 B1 | 11/2009 |
| CN | 101663625 A | 3/2010 |

(Continued)

OTHER PUBLICATIONS

European Search Report dated May 13, 2019 in European Application 18199430.2 filed on Oct. 9, 2018 (with English Translation of Categories of Cited Documents & Written Opinion).

(Continued)

*Primary Examiner* — Tsion Tumebo
(74) *Attorney, Agent, or Firm* — Oblon, McClelland, Maier & Neustadt, L.L.P.

(57) ABSTRACT

A display device for a portable object wherein the portable object includes a dial and at least one movable hand, at least one movable hand includes a light source or is coupled to a light source, the dial includes at least one secondary light waveguide, the light source and the secondary waveguide being arranged such that the light source is coupled to the proximal end of the secondary waveguide when the movable hand moves into a predetermined sector of the dial, and the distal end of the secondary waveguide being coupled to a display element of the dial.

22 Claims, 3 Drawing Sheets

(56) References Cited

U.S. PATENT DOCUMENTS

| | | | | |
|---|---|---|---|---|
| 4,872,093 | A * | 10/1989 | Shimizu | G01D 11/28 362/23.15 |
| 4,872,415 | A * | 10/1989 | Nakadozono | G01D 11/28 116/288 |
| 5,697,322 | A * | 12/1997 | Hay | G01D 13/28 116/286 |
| 5,915,822 | A * | 6/1999 | Ogura | B60K 37/02 362/23.18 |
| 6,032,608 | A * | 3/2000 | Oreans | G01D 11/28 116/288 |
| 6,806,644 | B2 * | 10/2004 | Ueno | G02F 1/133617 313/510 |
| 6,863,411 | B2 * | 3/2005 | Furuya | G01D 13/28 362/23.18 |
| 7,038,975 | B2 * | 5/2006 | Ferri | G04B 19/042 116/288 |
| 8,016,442 | B2 * | 9/2011 | Kato | G01D 11/28 362/23.21 |
| 8,169,858 | B2 * | 5/2012 | Klopfenstein | G04G 9/0041 368/67 |
| 8,261,686 | B2 * | 9/2012 | Birman | B60K 37/02 116/286 |
| 9,568,343 | B2 * | 2/2017 | Birman | B60K 37/02 |
| 2006/0067168 | A1 * | 3/2006 | Winkler | G04G 9/0041 368/67 |
| 2006/0185576 | A1 * | 8/2006 | Tane | B60K 37/02 116/288 |
| 2008/0002386 | A1 * | 1/2008 | Mezouari | G01D 11/28 362/23.16 |
| 2009/0109801 | A1 * | 4/2009 | Winkler | G04B 45/0015 368/67 |
| 2010/0202255 | A1 * | 8/2010 | Klopfenstein | G04B 19/32 368/226 |
| 2013/0083508 | A1 | 4/2013 | Murata et al. | |
| 2015/0103509 | A1 * | 4/2015 | Sato | G01D 11/28 362/23.14 |
| 2015/0346690 | A1 | 12/2015 | Tortora | |
| 2016/0054522 | A1 | 2/2016 | Osellame et al. | |

FOREIGN PATENT DOCUMENTS

| | | |
|---|---|---|
| CN | 104567970 A | 4/2015 |
| EP | 2 950 167 A1 | 12/2015 |
| JP | 2015-025789 A | 2/2015 |
| WO | WO 01/44871 A1 | 6/2001 |
| WO | WO 2014/170872 A1 | 10/2014 |

OTHER PUBLICATIONS

Japanese Office Action dated Oct. 13, 2020 in Japanese Patent Application No. 2019-182654 (with English translation), 4 pages.
First Office Action dated Dec. 2, 2020 in corresponding Chinese Patent Application No. 201910949433.4 (with English translation)(14 pages).

* cited by examiner

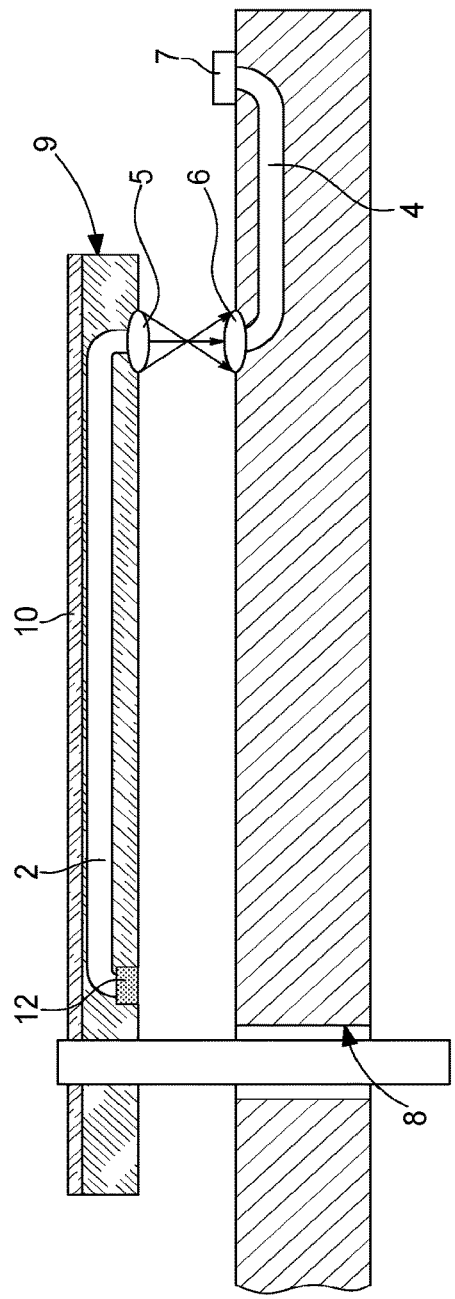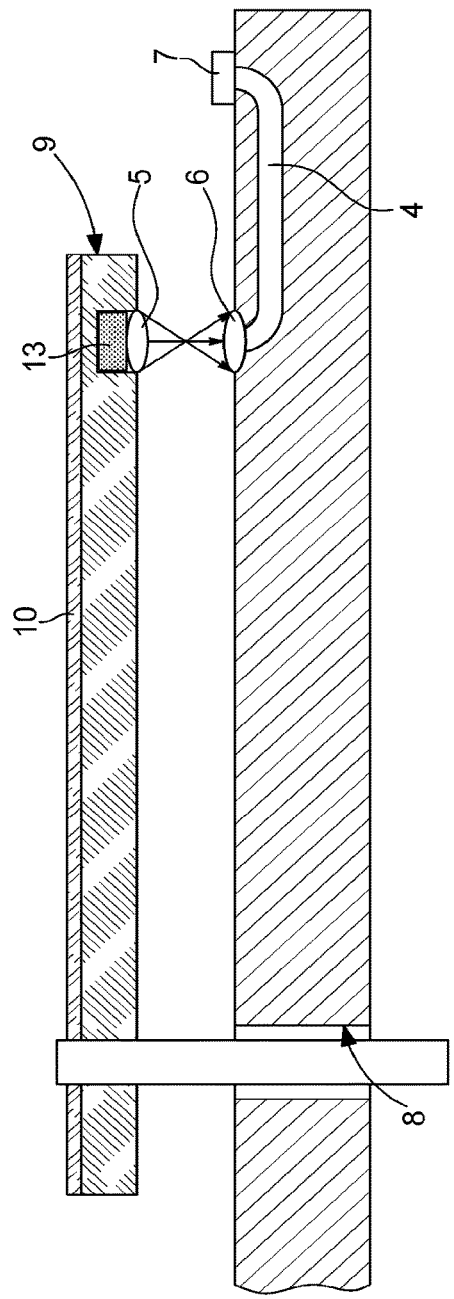

LUMINOUS DISPLAY DEVICE

CROSS-REFERENCE TO RELATED APPLICATION

This application claims priority to European Patent Application No. 18199430.2 filed on Oct. 9, 2018, the entire disclosure of which is hereby incorporated herein by reference.

FIELD OF THE INVENTION

The present invention concerns a luminous display device for a portable object. The present invention concerns, in particular, a luminous display device for a timepiece such as a wristwatch or a measuring apparatus with an analogue display.

BACKGROUND OF THE INVENTION

Watch hands evidently have a functional role, for example indicating the current time, but they also have a decorative role by greatly contributing to the aesthetic appearance of the watch to which they are fitted. To this end, the hands must meet strict criteria. A well known technique in the world of watchmaking for allowing the hands to be seen in the dark consists in coating the surface of the hands oriented towards the user with a layer of phosphorescent material. One example of such a material is a non-radioactive photoluminescent pigment sold by the Japanese company Nemoto & Co. Ltd, under the registered trademark Super-Luminova®. This pigment may also be used to coat the hour symbols on the watch dial. In daytime, the layer of phosphorescent material absorbs light energy. This light energy is then released at night by the layer of phosphorescent material in the form of luminous radiation. This technique of illuminating the hands of a watch is quite convenient insofar as the layer of phosphorescent material operates in a completely passive manner and therefore does not require actuation of any mechanical or electrical device in order to function, nor does it require any energy to be taken from the watch.

However, this technique of illuminating watch hands also has some drawbacks, the first of which requiring mention is the fact that the layer of phosphorescent material must be pre-illuminated by a light source before it is able to transmit light energy. Likewise, the phenomenon of retransmitting light by phosphorescence is time-limited, so that the luminosity of the phosphorescent layer decreases gradually as it releases the light energy that it has stored. Hands coated with a layer of phosphorescent material are not, therefore, of consistent appearance. Finally, there is a limited range of phosphorescent materials available on the market, so that most watches in which such materials are used eventually have the same appearance in the dark and even in broad daylight.

European Patent No. EP 2950167 proposes illuminating hands by means of a light source arranged in proximity to the hand arbor, the source being supplied with electricity via a conductor connected to the arbor on the one hand, and via a conductor in contact with the dial on the other hand. The hand of this document includes a waveguide for diffusing light throughout the hand, which makes it possible to see its orientation. However, this document does not solve the problem of illuminating the dial and, in particular, the problem of illuminating the indices on the dial.

SUMMARY OF THE INVENTION

It is an object of the present invention to overcome the aforementioned drawbacks in addition to others, by providing a device for displaying elements of a dial which can be illuminated on demand by the user, in a large variety of colours and while observing the dimensional and aesthetic constraints to which the device is subjected.

To this end, the present invention concerns a display device for a portable object, the portable object including a dial and at least one hand movable in rotation over the dial, said at least one movable hand including a light source or being coupled to a light source, the dial comprising at least one secondary light waveguide having a proximal end arranged in a predetermined sector of the dial and a distal end defining a display area, the light source and the secondary waveguide being arranged such that the light source is coupled to the proximal end of the secondary waveguide when the movable hand moves into a predetermined sector of the dial, and the distal end of the secondary waveguide being coupled to a display element of the dial arranged in the display area.

Advantageously, said at least one movable hand includes a primary light waveguide, wherein a proximal end of the primary light waveguide is coupled to the light source, a distal end of the primary waveguide and a proximal end of the secondary waveguide are arranged such that the primary waveguide is coupled to the proximal end of the secondary waveguide when the movable hand moves into the predetermined sector of the dial.

Preferably, the light source is an annular area secured to the dial and coupled to the proximal end of the primary waveguide.

According to an alternative of the invention, the light source is incorporated in the movable hand.

According to another alternative, the hand is replaced by a movable disc including the primary light waveguide.

Advantageously, the movable hand includes a transparent material in which said primary waveguide is written, said primary waveguide being curved in order to facilitate light extraction and coupling to said secondary waveguide.

Preferably, the primary waveguide includes a rectilinear portion connected at both ends thereof by two curved portions respectively opening opposite the light source and the proximal end of the secondary waveguide. In such case, the primary waveguide is preferably made in the thickness of the hand.

Preferably, the dial includes at least one transparent layer in which said secondary waveguide is written, said secondary waveguide being curved to facilitate coupling to the light source and the display element.

Advantageously, the secondary waveguide includes a rectilinear portion connected at both ends thereof by two curved portions respectively opening opposite the distal end of the primary waveguide and the display element. Preferably, the secondary waveguide is made in the thickness of the transparent layer of the dial.

Advantageously, the light source emits light at at least one wavelength less than 450 nm, the display device including fluorescent pigments that emit visible light when they are illuminated by said light source.

Microlenses preferably couple the light source to the secondary waveguide(s). In such case, the microlenses are advantageously arranged opposite the distal end of the primary waveguide and the proximal end of the secondary waveguide.

Advantageously, the hand includes an opaque decorative layer concealing the primary waveguide or the light source.

Preferably, the dial includes a plurality of secondary waveguides extending along radii arranged regularly over 360°.

Advantageously, the dial includes a first set of secondary waveguides, each having a distal end associated with a minute or five minute or quarter-hour index of an hour circle.

Preferably, the display device of the invention includes a second hand movable in rotation over the dial, and the dial includes a second set of secondary waveguides, the second hand including a second light source or being coupled to a second light source, the second light source and the second set of secondary waveguides being arranged such that the second light source is coupled to the proximal end of a secondary waveguide of the second set of secondary waveguides when the movable second hand moves into a second predetermined sector of the dial, and the distal end of the secondary waveguide of the second set of secondary waveguides is coupled to a display element of the dial arranged in the display area. In such case, the dial preferably includes a second set of secondary waveguides, each having a distal end associated with an hour index of an hour circle.

Advantageously, the second hand includes a primary light waveguide, a proximal end of the primary light waveguide being coupled to the second light source, a distal end of the primary waveguide and a proximal end of the secondary waveguide being arranged such that the primary waveguide is coupled to the proximal end of a secondary waveguide of the second set of secondary waveguides when the second movable hand moves into the second predetermined sector of the dial.

Preferably, the first and second light sources are coincident.

Advantageously, the distal ends of the secondary waveguides of the first set of secondary waveguides and the distal ends of the secondary waveguides of the second set of secondary waveguides are each arranged along a circle of different diameter.

Another aspect of the invention concerns a watch, such as a wristwatch, including a display device according to the invention.

Preferably, the watch of the invention includes two movable hands each including a primary waveguide, the primary waveguide of one of the two hands being arranged to be coupled in succession to display elements designating the minute indices of the watch, and the other hand being arranged to be coupled in succession to display elements designating the hour indices of the watch.

BRIEF DESCRIPTION OF THE DRAWINGS

Other features and advantages of the present invention will appear more clearly upon reading the following detailed description of one embodiment of the invention, this example being given solely by way of non-limiting illustration with reference to the annexed drawings.

FIG. 3 represents a sectional view of another example display device according to the invention.

FIG. 4 represents a sectional view of another example display device according to the invention.

DETAILED DESCRIPTION OF ONE EMBODIMENT OF THE INVENTION

Figure 1:
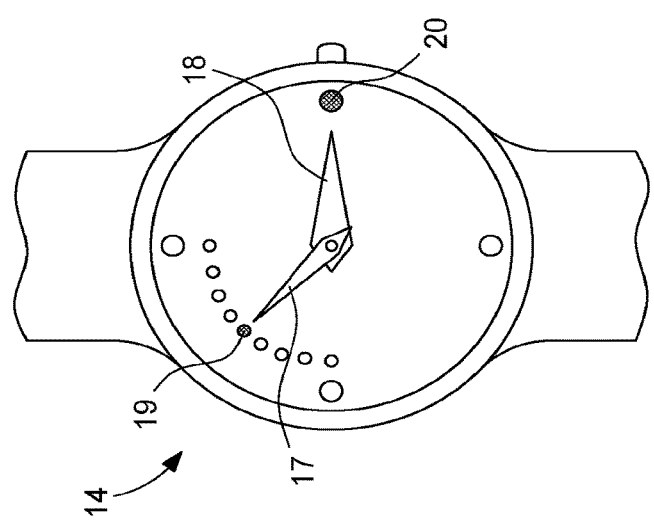
FIG. 1 is a view of an example wristwatch according to the invention.

The present invention proceeds from the general inventive idea which consists in illuminating a watch index or any type of display element 7 of a dial 8 via light waveguides 4 integrated in dial 8, the waveguide 4 integrated in dial 8 being coupled to a waveguide 2 arranged in a hand 9 (or a movable disc) when this hand moves to a predetermined position. In this manner, the display device 7 illuminated at a given instant is determined by the position of the hand. Given the direction of travel of light from waveguide 2 of hand 9 towards waveguide 4 of dial 8, waveguide 2 of hand 9 will be referred to in the following description as the 'primary' waveguide 2, and waveguide 4 of dial 8 the 'secondary' waveguide 4.

The advantage of such an arrangement is to allow active display of the current hour or minute in a purely mechanical manner, without the need to provide as many light sources as indices, and without an addressing circuit to selectively illuminate the index corresponding to the current hour or minute.

Figure 2:
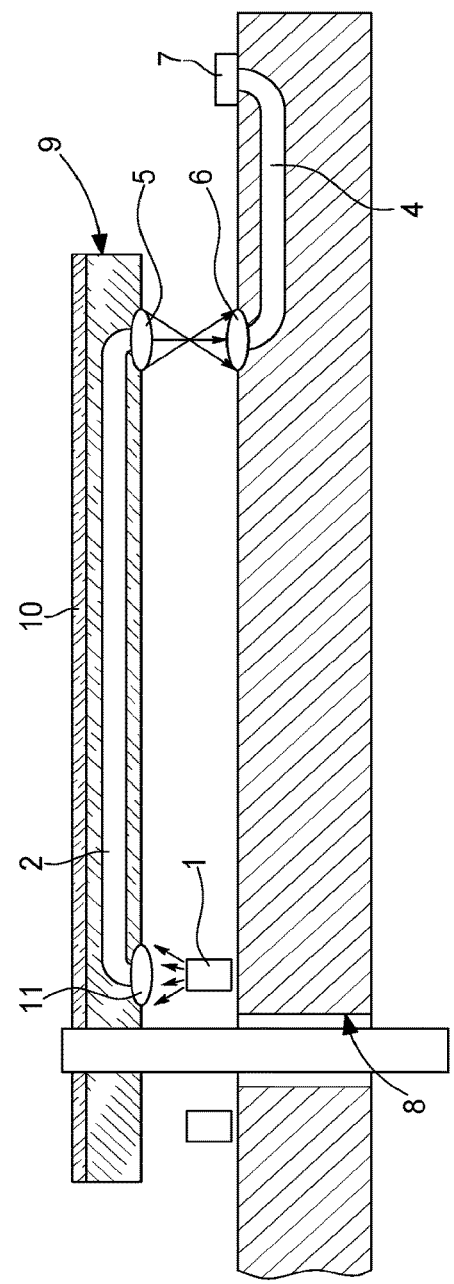
FIG. 2 represents a sectional view of an example display device according to the invention illustrating its operating principle.

According to a preferred embodiment of the invention, as represented in FIG. 2, light source 1 powering primary waveguide 2 is secured to dial 8 in immediate proximity to the arbor of hand 9. The source can thus advantageously be coupled to primary waveguide 2 via a microlens 11. In such case, the source is preferably an annular LED illuminating the base of hand 9. According to a variant, the light source can be formed of an OLED source extending in a ring. Likewise, as an alternative to the arrangement represented in FIG. 2, microlens 11 could be integrated in the LED and have a curvature that corresponds to the numerical aperture of primary waveguide 2. This variant advantageously allows more light to be coupled in primary waveguide 2. Alternatively, as represented in FIG. 3, a light source 12 can be integrated in hand 9. In such case, this light source 12 can, for example, be powered by a system like that described in European Patent No. EP2950167 and coupled to primary waveguide 2 in proximity to the arbor.

Finally, according to another alternative represented in FIG. 4, the light source can be arranged directly under hand 9, opposite coupling area 6 of the secondary waveguide. Nonetheless, this arrangement can be complicated by the thinness of the hands. However, in such case, the light source is directly coupled to secondary waveguide 4, without the need for a primary waveguide.

In all cases, light source 1, 12, 13 is preferably a high efficiency source such as an LED or a low-power semiconductor laser.

Advantageously, hand 9 includes a layer of transparent material in which primary waveguide 2 is written. By "writing" a waveguide in a transparent material, we mean producing a tubular volume forming a waveguide by a local increase in the refractive index. Such writing can be obtained by a known method such as the use of focused short-pulse lasers (femtoseconds). Such methods are described, for example, in Patent Publication Nos. WO 01/44871 and WO 2014/170872. The advantage of a waveguide written/inscribed in a transparent material is, on the one hand, to avoid a complex assembly, and on the other hand to allow discrete implementation.

The transparent material can also be coated with a layer of opaque material 10, which has the advantage of concealing light source 1, 12 and providing an aesthetic advantage.

According to a variant, the transparent material can be deposited on a conventional hand, for example made of bronze or brass, with the waveguide then being written in the transparent material. By way of example, such a material can be a diamond layer. This variant can of course also be implemented in conjunction with the dial which can be coated with a layer of transparent material and then written as mentioned above.

Secondary waveguide 4 is preferably integrated in a transparent layer in which said secondary waveguide 4 is inscribed. This inscription is particularly advantageous in the case of dial 8. Indeed, there should generally be as many waveguides 4 as indices, i.e. often twelve indices 7 for display of the hours and twelve indices for the five minute display, i.e. a total of 24 distinct waveguides. Writing with a laser beam makes such complexity possible with largely satisfactory precision.

It will be noted that, in the case of the dial, and especially because this concerns a bulkier element than a thin hand, secondary guides 4 could, in a variant, be integrated in the thickness of the dial in the form of transparent plastic or glass wafers.

The coupling between primary waveguide 2 and secondary waveguide preferably occurs via microlenses 5, 6 to reduce the loss of light in the coupling area.

Preferably, and so that there is permanently at least one illuminated display area for each hand 9, coupling area 6 of secondary waveguide 4 has a smaller area than the projection area of the incident light beam on the dial, and the distance between two successive coupling areas 6 is smaller than the largest dimension of the incident beam on the dial.

The light from the secondary waveguide is preferably extracted by an area 7 having a frosted surface finish to diffuse light in all directions.

Advantageously, the light injected into primary waveguide 2 is a UV or blue light having at least one wavelength of less than 450 mm, preferably less than 380 nm, and index area 7 includes fluorophores emitting in the visible spectrum when they are excited by blue or UV light. Such a combination makes it possible to reduce any spurious light that might be seen by the user and concentrates the user's attention on the illuminated index area.

At least one secondary waveguide can advantageously be coupled to a sensor coupled to a processor, for example, in order to precisely control the displayed time, and compare this data to a reference clock for a possible automatic adjustment.

Figure 5:
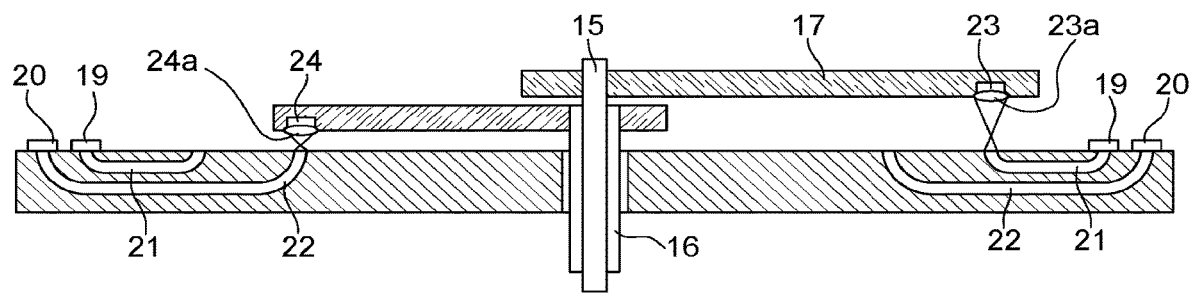
FIG. 5 represents a sectional view of an example display device including two hands.
Figure 6:
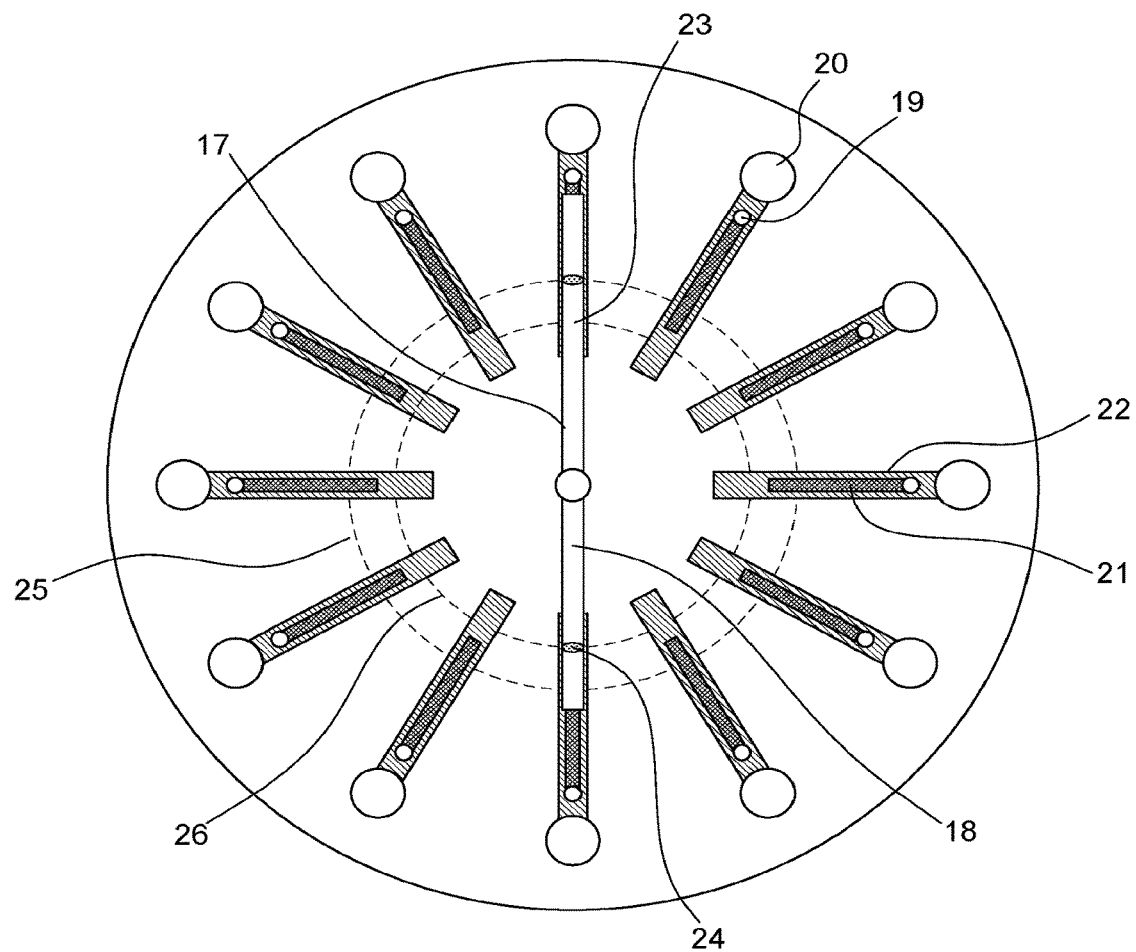
FIG. 6 represents a schematic view of the general arrangement of the waveguides in a display device according to the invention.

FIG. 5 represents a sectional view of a preferred example watch dial according to a preferred example of the invention. This Figure corresponds to the top view of FIG. 6.

FIG. 5 shows a hand 18 corresponding to the hour display whose light source 24 is coupled via a microlens 24a to one of the waveguides 22 illuminating the hour index 20, when the hand moves opposite the latter. In a similar manner, light source 23 of hand 17 corresponding to the minute display is coupled via a microlens 23a to one of the waveguides 21 illuminating the minute index 19 when the hand moves opposite the latter.

It will be noted that, in the embodiment of FIG. 5, the microlenses at the entrance to the secondary waveguide have been omitted. Evidently, according to a first variant these microlenses can be added at the entrance to the secondary waveguide and in a second variant microlenses 23a, 24a can also be omitted.

The proximal ends of the waveguides illuminating the hour indices are arranged on a first circumference 26, while the minute indices are arranged on a second circumference 25, to avoid interference between the two displays. It is evident that the fluorophores can also be in a different colour for the hours and minutes, or for the minutes and quarter-hours, for example.

It is evident that the present invention is not limited to the embodiments that have just been described and that various simple modifications and variants can be envisaged by those skilled in the art without departing from the scope of the invention as defined by the annexed claims. In particular, display elements 7 could have shapes other that of discs, for example segment shapes to form a number or character and to provide a numerical display or any other figurative form. In the example described above, the waveguides are made by local modification of the refractive index, invisible to the naked eye, however, it is possible to envisage making these waveguides by producing an internal defect to create a light diffusion path inside the material and thereby create waveguides that are visible to the naked eye.

KEY TO DRAWINGS

1. Light source
2. Primary waveguide
3. Coupling area
4. Secondary waveguide
5. Microlens at the exit of the primary waveguide
6. Microlens at the entrance of the primary waveguide
7. Display element
8. Dial
9. Movable hand
10. Opaque layer
11. Microlens at the entrance of the primary waveguide
12. Light source
13. Light source
14. Portable object
15. Minute hand arbor
16. Hour hand arbor
17. Minute hand
18. Hour hand
19. Minute index
20. Hour index
21. Secondary waveguide for the minutes
22. Secondary waveguide for the hours
23. Light source for the minutes
23a Microlens at the exit of the primary waveguide
24. Light source for the hours
24a Microlens at the exit of the primary waveguide
25. Circumference for coupling the minutes
26. Circumference for coupling the hours

The invention claimed is:

1. A display device for a portable object, comprising:
a dial and at least one hand movable in rotation over the dial, said at least one movable hand including a light source or being coupled to a light source, the dial including at least one secondary light waveguide having a proximal end arranged in a predetermined sector of the dial and a distal end defining a display area, the light source and the secondary waveguide being arranged such that the light source is coupled to the proximal end of the secondary waveguide when the movable hand moves into the predetermined sector of the dial, and the distal end of the secondary waveguide is coupled to a display element of the dial arranged in the display area, wherein:

said at least one movable hand includes a primary light waveguide, wherein a proximal end of the primary light waveguide is coupled to the light source, a distal end of the primary waveguide and a proximal end of the secondary waveguide are arranged such that the primary waveguide is coupled to the proximal end of the secondary waveguide when the movable hand moves into the predetermined sector of the dial, or when said at least one movable hand includes said light source, said light source and a proximal end of the secondary waveguide are arranged such that the primary waveguide is coupled to the proximal end of the secondary waveguide when the movable hand moves into the predetermined sector of the dial.

2. The display device according to claim 1, wherein the light source is an annular area secured to the dial and coupled to the proximal end of the primary waveguide.

3. The display device according to claim 1, wherein the light source is integrated in the movable hand.

4. The display device according to claim 1, wherein the movable hand comprises a transparent material wherein said primary waveguide is written, said primary waveguide being curved to facilitate light extraction and coupling to said secondary waveguide.

5. The display device according to claim 4, wherein the primary waveguide includes a rectilinear portion connected at both ends thereof by two curved portions respectively opening opposite the light source and the proximal end of the secondary waveguide.

6. The display device according to claim 4, wherein the primary waveguide is made in the thickness of the hand.

7. The display device according to claim 1, wherein the dial comprises at least one transparent layer wherein said secondary waveguide is written, said secondary waveguide being curved to facilitate coupling to the light source and the display element.

8. The display device according to claim 7, wherein the secondary waveguide comprises a rectilinear portion connected at both ends thereof by two curved portions respectively opening opposite the distal end of the primary waveguide and the display element.

9. The display device according to claim 7, wherein the secondary waveguide is made in the thickness of the transparent layer of the dial.

10. The display device according to claim 1, wherein said light source emits light at a wavelength less than 450 nm, the display element including fluorescent pigments emitting visible light when they are illuminated by said light source.

11. The display device according to claim 1, wherein the device comprises microlenses for coupling the light source to the secondary waveguide.

12. The device according to claim 11, wherein the microlenses are arranged opposite the distal end of the primary waveguide and the proximal end of the secondary waveguide.

13. The display device according to claim 1, wherein the hand comprises an opaque decorative layer concealing the primary waveguide or the light source.

14. The display device according to claim 1, wherein the dial comprises a plurality of secondary waveguides extending in radii regularly angularly arranged over 360°.

15. The display device according to claim 1, wherein the dial comprises a first set of secondary waveguides each having a distal end associated with a minute index of an hour circle.

16. The display device according to claim 15, wherein the display device comprises a second hand movable in rotation over the dial, wherein the dial includes a second set of secondary waveguides, the second hand including a second light source or being coupled to a second light source, the second light source and the second set of secondary waveguides being arranged such that the second light source is coupled to the proximal end of a secondary waveguide of the second set of secondary waveguides when the movable second hand moves into a second predetermined sector of the dial, and the distal end of the secondary waveguide of the second set of secondary waveguides is coupled to a display element of the dial arranged in the display area.

17. The display device according to claim 16, wherein the distal ends of each of the secondary waveguides of the second set of secondary waveguides is associated with an hour index of an hour circle.

18. The display device according to claim 16, wherein the second hand comprises a second primary light waveguide, a proximal end of the second primary light waveguide being coupled to the second light source, a distal end of the second primary waveguide and a proximal end of the secondary waveguide being arranged such that the second primary waveguide is coupled to the proximal end of a secondary waveguide of the second set of secondary waveguides when the second movable hand moves into the second predetermined sector of the dial.

19. The display device according to claim 16, wherein the first and second light sources are coincident.

20. The display device according to claim 15, wherein the distal ends of the secondary waveguides of the first set of secondary waveguides and the distal ends of the secondary waveguides of the second set of secondary waveguides are each arranged along a circle of different diameter.

21. The display device according to claim 1, wherein the movable hand or hands are replaced by a movable disc comprising said primary light waveguide.

22. A watch comprising:

a display device wherein the portable object includes a dial and two hands movable in rotation over the dial, each of said two movable hands including a light source or being coupled to a light source, the dial including at least one secondary light waveguide having a proximal end arranged in a predetermined sector of the dial and a distal end defining a display area, the light source and the secondary waveguide being arranged such that the light source is coupled to the proximal end of the secondary waveguide when the movable hand moves into the predetermined sector of the dial, and the distal end of the secondary waveguide is coupled to a display element of the dial arranged in the display area, wherein:

the two hands each include a primary waveguide, the primary waveguide of one of the two hands being arranged to be coupled in succession to display elements designating minute indices and the other hand being arranged to be coupled in succession to display elements designating hour indices, or when said movable hands include said light source, said light source of one of the two hands is arranged to be coupled in succession to display elements designating minute indices and the light source of the other hand being arranged to be coupled in succession to display elements designating hour indices.

\* \* \* \* \*